Dec. 27, 1938.  A. F. RICHTER  2,141,558
SNOW PLOW ATTACHMENT FOR MOTOR VEHICLES
Filed Jan. 21, 1937
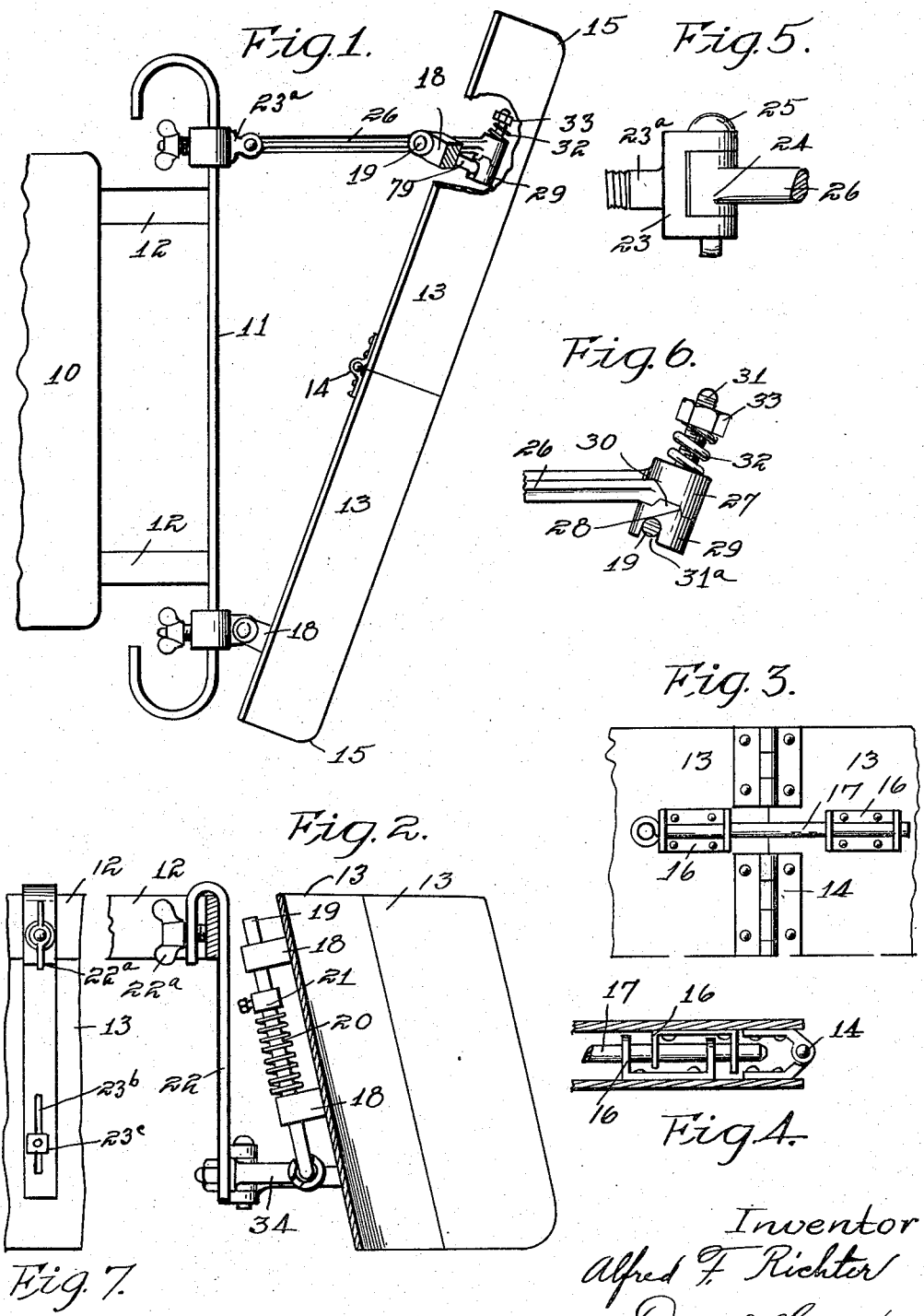
Inventor
Alfred F. Richter
by Dwight Hague Attys Patented Dec. 27, 1938

2,141,558

UNITED STATES PATENT OFFICE 2,141,558

SNOW PLOW ATTACHMENT FOR MOTOR VEHICLES

Alfred F. Richter, Des Moines, Iowa

Application January 21, 1937, Serial No. 121,526

9 Claims. (Cl. 37—42)

The object of my invention is to provide a snow plow of simple, durable, and inexpensive construction, and which may be readily, quickly, and easily attached to an automobile without the use of tools and in a manner readily accessible to an operator standing in front of an automobile and which is adjustable vertically to adapt it for automobile bumpers at varying height from the roadway.

A further object is to provide a device of this character in which one of the brackets for attaching the device to an automobile may be freely moved laterally for convenience in attaching it to a selected position upon an automobile bumper.

A further object is to provide a device of this class which may be readily, quickly, and easily adjusted to move material either to the right or left of the automobile and which may be attached either to the front or rear bumper.

A further object is to provide a snow plow of this class which may be readily and easily folded to occupy a minimum of space and be firmly supported, both when in position for use and when folded.

A further object is to provide a snow plow in which the scraper blade will freely move up and down to ride over ordinary obstructions or uneven surfaces of a roadway and when excessive pressure is applied to the lower edge of the blade it will move to a position inclined rearwardly, from which position it may be automatically returned to normal position by a rearward movement of the vehicle.

Referring to the accompanying drawing, I have used the reference numeral 10 to indicate that portion of the automobile shown in the accompanying drawing.

Figure 1 shows a top or plan view of my invention with parts broken away.

Figure 2 shows a vertical section of same.

Figure 3 shows a detail rear elevation of a part of the scraper blade, to illustrate the hinge and bolt construction.

Figure 4 shows a detail horizontal section, with the blade members folded.

Figure 5 shows a detail side elevation of one of the supporting bars.

Figure 6 shows a detail plan view of the spring clutch device, and

Figure 7 shows a rear elevation of one of the brackets. Supported in front of the automobile is a bumper 11 carried by the spring metal arms 12, of ordinary construction.

The scraper blade 13 is formed of two parts, hinged together at the vertical center of the blade, by the hinge 14. The lower outer edges of the blade are rounded at 15 so that the blade will be guided upwardly over ordinary roadway obstructions.

On the rear of each blade member is a pair of lugs 16 having openings therein through which the bolt 17 may be extended. These lugs are so shaped and positioned that when the blade members are in line with each other, the bolt may be passed through the openings in the lugs as shown in Figure 3, and when the blade members are folded to overlapping positions the bolt may be passed through the openings in the lugs, to hold the parts together in folded position.

On the rear of each blade member are two lugs 18 mounted on a guide rod 19. On this same rod is a spring 20 engaging one of the lugs 18 and having its upper end engaged by an adjustable collar 21 on the rod 19, for regulating the downward pressure of the spring upon the scraper blade.

For supporting the plow upon an automobile I have provided two brackets 22 each having a hook shaped upper end to receive a bumper and a set screw 22a for clamping the bracket to the bumper. At the lower end of one of the brackets is a hinge member 23 having a screw threaded extension 23a extended through a vertical slot 23b in the bracket. A nut 23c is placed on the extension 23a for adjustably fixing the scraper blade to the bracket to adapt the device for use with bumpers at various heights from a roadway. A cooperating hinge member 24 is connected to the hinge members 23 by a detachable pin 25. A supporting bar 26 extends forwardly from the hinge member 24 and is provided at its forward end with a clutch member 27 having a central opening and a groove at one end formed with inclined side edges 28 as shown in Figure 6. A connecting clutch member 29 is provided and it has a rib 30 with inclined sides to enter said groove. The guide rod 19 has its lower end 31 extended horizontally through said clutch members and through a notch 31a in the clutch member 29, and a spring 32 and an adjusting nut 33 are supplied thereto for regulating the yielding pressure applied to the clutch device. The supporting rod 26 is pivotally connected at its front to the scraper blade and at its rear to the bracket 22, hence, when the scraper blade is in its proper position relative to the automobile the bracket 22 may be moved laterally, to thereby apply it to a selected portion of the bumper.

For supporting the other end of the scraper blade I have provided a short supporting arm 34 adjustably fixed to the bracket 22 in the same manner as the extension 23a. At its forward end is a clutch device similar to the one previously described. This supporting bar 34 has no hinge, hence, when its bracket is fixed to a bumper the scraper blade is held against movement laterally relative to an automobile to which it is attached.

In practice the complete device may be stored or shipped in its folded position, occupying a minimum of space, so that it may be placed in the usual storage compartment of an automobile. To apply it to an automobile the operator unfolds the blade and places the bolt 17 in the position shown in Figure 3, for rigidly supporting the blade in its extended position. Then the bracket 22 to which the short supporting arm 34 is applied is secured to the bumper by the set screw 22a which may easily be done without tools by an operator standing adjacent the bumper. Then the other bracket 22 to which the long hinged arm 26 is applied, is moved to a selected position on the bumper where it will not interfere with any of the attachments to the bumper, and is clamped in position.

In use when the automobile is advanced the resilience of the bumper supporting spring arm tends to yieldingly hold the scraper to a roadway and said arms will spring enough to permit the blade to ride over ordinary obstructions on the roadway. The rounded edge 15 of the scraper guides it up over such obstructions. By having the guide bars 19 inclined upwardly and rearwardly and the scraper slidingly mounted thereon, the blade may ride over obstructions in a roadway and be held down by the springs 20.

The scraper may be adjusted by detaching the supporting bars from the blade and interchanging them, so that the material may be moved toward either the right or left and the snow plow may be secured to the rear bumper of an automobile when desired.

When the scraper blade strikes an obstruction which it cannot move or ride over, the spring clutch device permits the scraper blade to move to a downwardly and rearwardly inclined position, so that it may ride over the obstruction. Its lower edge is yieldingly held downwardly against the roadway when in this position and hence, when the automobile is backed, the scraper blade will be returned to its normal working position.

I claim as my invention:

1. In a snow plow for automobiles, the combination of two brackets, means for detachably connecting them to an automobile bumper, a scraper blade, two supporting bars, one long and one short, rotatably and detachably connected to said brackets and rotatably and detachably connected to said scraper blade, whereby the supporting bars may be interchanged for holding the scraper blade in position to move material either to the right or left and whereby the bracket with the long supporting bar may be moved laterally for convenience in applying it to selected positions on the bumper.

2. In a device of the class described, the combination of a scraper blade, a bracket, means for detachably connecting the bracket to an automobile bumper, a supporting arm connected to the bracket, a guide bar supported on the forward end of the supporting arm and inclined upwardly and rearwardly, means for slidingly connecting the scraper blade with said guide bar whereby the scraper blade may move up and down to conform to a road surface.

3. In a device of the class described, the combination of a scraper blade, a bracket, means for detachably connecting the bracket to an automobile bumper, a supporting arm connected to the bracket, a guide bar supported on the forward end of the supporting arm and inclined upwardly and rearwardly, means for slidingly connecting the scraper blade with said guide bar whereby the scraper blade may move up and down to conform to a road surface, and a spring for applying yielding pressure downwardly to the scraper blade.

4. In a device of the class described, the combination of a scraper blade, a bracket, means for detachably connecting the bracket to an automobile bumper, a supporting arm connected to the bracket, a guide bar pivotally attached to the forward end of the supporting bar to swing forwardly and rearwardly, a scraper blade carried by said guide bar, and releasable means for holding the guide bar in a fixed position.

5. In a device of the class described, the combination of a scraper blade, a bracket, means for detachably connecting the bracket to an automobile bumper, a supporting arm connected to the bracket, a guide bar pivotally attached to the forward end of the supporting bar to swing forwardly and rearwardly, a scraper blade carried by said guide bar, and yielding pressure means for normally holding the guide bar in a fixed position but permitting it to swing forwardly at its upper end when excessive pressure is applied to the lower edge of the scraper blade.

6. In a device of the class described, the combination of a scraper blade, two brackets, one above the other fixed to the rear of the scraper blade, a guide rod slidingly mounted in said brackets, a spring on the guide rod in engagement with the lower bracket, means for adjusting the tension of the spring, a supporting bar pivotally connected to the guide arm and a bracket pivotally connected to the supporting bar.

7. In a device of the class described, the combination of a scraper blade, a bracket, means for attaching the bracket to a vehicle, a supporting arm carried by the bracket and extended forwardly, a guide rod pivoted to the forward end of the supporting arm to swing forwardly and rearwardly, means for supporting the scraper blade on said guide rod, a clutch member fixed to the guide rod, a co-acting clutch member carried by the scraper, one of said clutch members having a rib with beveled edges and the other having a co-operating groove with beveled edges, and a spring for holding them toward each other, whereby the said guide rod is normally held in an upwardly and rearwardly inclined position, but may be tilted by excessive pressure upon the lower edge of the scraper blade to a position inclined upwardly and forwardly and when in that position the scraper blade will be returned to normal position by a backward movement of the scraper blade with its lower edge resting upon a roadway.

8. In a device of the class described, the combination of a scraper blade formed of two parts hinged together; two lugs fixed to each part and projected rearwardly and provided with bolt openings, said lugs being so positioned that a bolt may be passed through the openings when the parts of the blade are in line and also when the parts of the blade are folded into overlapping positions.

9. In a device of the class described, the combination of a scraper, two supporting arms, means at their rear ends for detachably securing them to an automobile bumper, substantially upright rods at the forward ends of said arms, means for adjustably connecting said arms to the scraper whereby the scraper may be vertically adjusted relative to the bumper, and yielding pressure devices applied to the scraper for yieldingly holding it downwardly relative to the arms.

ALFRED F. RICHTER.